Figure 1:
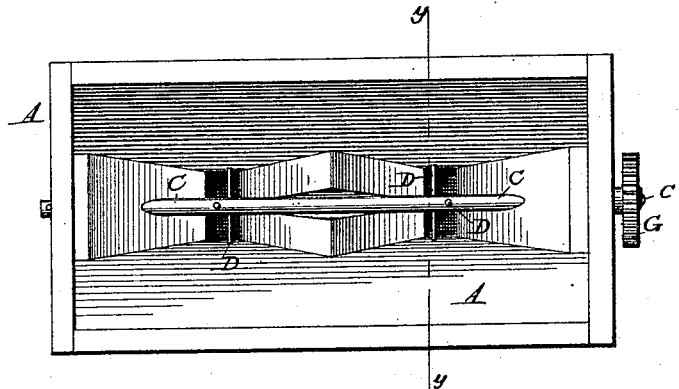

(No Model.)

H. L. BROWN.
SEEDING MACHINE.

No. 463,479. Patented Nov. 17, 1891.

ON LINE Y—Y

Attest.
Sidney P. Hollingsworth
Wm. L. Kennedy

Inventor.
Hiram L. Brown
By his Atty.
Phil. S. Dodge

UNITED STATES PATENT OFFICE.

HIRAM L. BROWN, OF SHORTSVILLE, NEW YORK.

SEEDING-MACHINE.

SPECIFICATION forming part of Letters Patent No. 463,479, dated November 17, 1891.

Application filed June 18, 1886. Serial No. 205,573. (No model.)

*To all whom it may concern:*

Be it known that I, HIRAM L. BROWN, of Shortsville, in the county of Ontario and State of New York, have invented certain Improvements in Seeding-Machines, of which the following is a specification.

My invention relates to those grain-drills and seeders in which seed-cups containing feed-wheels are used beneath the hopper to deliver the grain therefrom. In the use of these machines much difficulty is encountered in delivering certain classes of oats having a rough or fibrous jacket, commonly known as "Southern" or "rust-proof" oats. The difficulty arises mainly by reason of the trouble in forcing the oats into the seed-cup and in overcoming their tendency to lodge or house over the mouth of the cup.

My invention consists in combining with the seed-hopper an agitator having a finger or fingers arranged to work downward through the bottom of the hopper and into the top of this seed cup or distributer. The agitator thus arranged may be variously constructed; but I prefer to make use of the horizontal rotary shaft mounted in the bottom of the hopper and provided with radial fingers acting downward through the bottom of the hopper and in the mouths or throats of the distributers. The shaft may be driven in any suitable manner; but a simple arrangement consists in providing it with a pinion in which a second pinion of the shaft which carries the feed disks or wheels engages.

As the machine may be in all other respects of ordinary construction, I have represented in the drawings those parts which are directly connected with my improvement.

Figure 2:
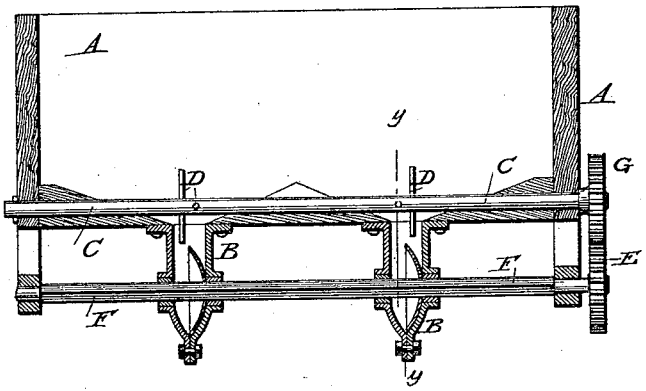
Figure 3:
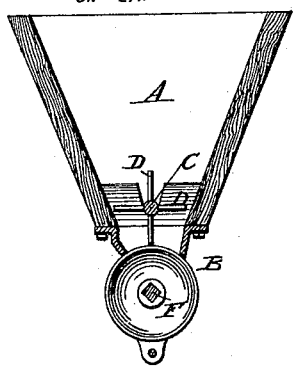

Referring to the accompanying drawings, Figure 1 is a top plan view of one end of the hopper containing my improvements; Fig. 2, a longitudinal vertical section of the same. Fig. 3 is a vertical cross-section on the line *y y*.

Referring to the drawings, A represents the ordinary feed-hopper, and B the feed cups or distributers attached to the under side thereof. The hopper-bottom is provided with throats or openings within inclined walls, through which the seed descends into the mouths of the cups or distributers, as usual.

I mount in the bottom of the hopper A the horizontal shaft C, seating the same, preferably, in the horizontal groove in the upper part, as shown. I provide this shaft with teeth D of any appropriate form, and attached thereto in any suitable manner, providing only that they are arranged to extend downward into the mouths of the distributers B. I commonly use for the purpose pins driven tightly through holes drilled in the shaft C at right angles to each other.

E represents a pinion secured to the shaft F, by which the distributing-wheels are carried, and engaging the pinion G on the end of the agitator-shaft, communicating motion thereto and causing the arms D to sweep continuously into and through the mouths of the distributers whenever the latter are in action.

I am aware that a rotary agitator-shaft with radial fingers has been mounted in the upper part of the hopper distant from the distributers; but this I do not claim.

My invention resides in the arrangement of the agitator so that its fingers work in close proximity to the distributer-wheels, and in such manner as to prevent the grain from lodging and remaining at rest in or above the distributers.

Having thus described my invention, what I claim is—

1. In combination with the hopper and seed-cups, a rotary shaft located in the lower part of the hopper and provided with projections extending upward into the hopper and downward into the mouth of the seed cups or distributers beneath the hopper.

2. In combination with the hopper, the feed-cup thereunder, and the rotary distributer-wheel within the cup of the rotary shaft D, provided with pins or projections extending upward within the hopper and downward into the mouth of the feed-cup, and gearing, substantially as described, for revolving the shaft and the feed-wheels in opposite directions.

In testimony whereof I hereunto set my hand, this 17th day of June, 1886, in the presence of two attesting witnesses.

HIRAM L. BROWN.

Witnesses:
OLIVER S. TITUS,
P. T. DODGE.